Figure 9:
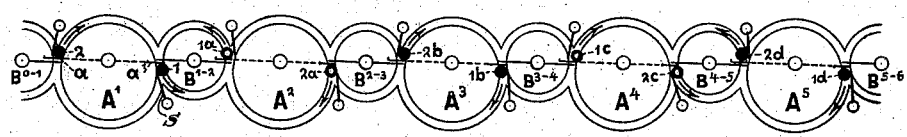

(No Model.) 3 Sheets—Sheet 1.
W. HEDTMANN, E. HENKELS, A. SCHMIEDEL & M. FISCHER.
BRAIDING MACHINE.
No. 293,020. Patented Feb. 5, 1884.
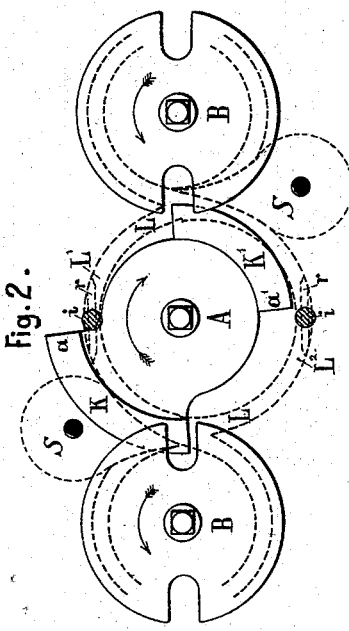
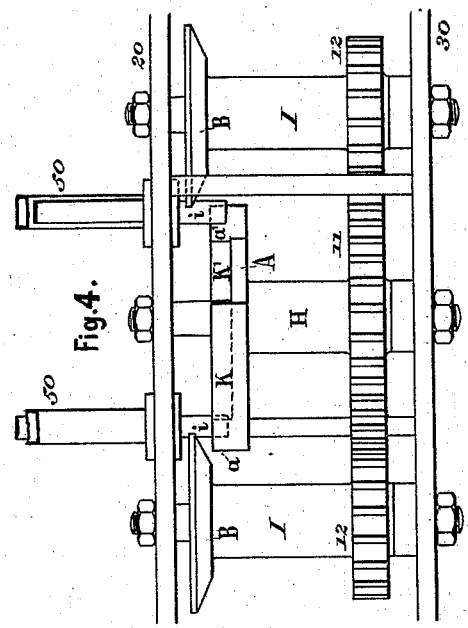
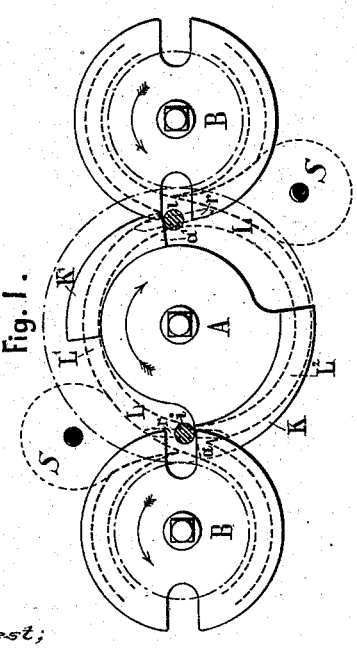
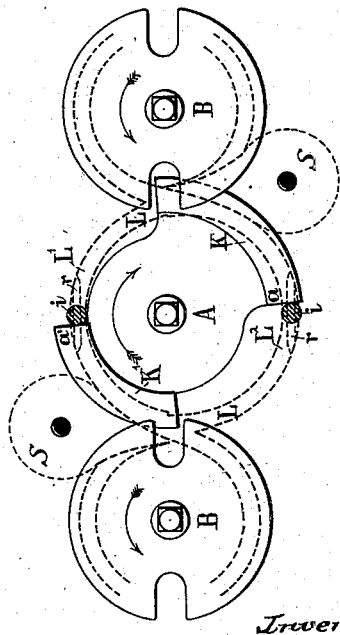

(No Model.) 3 Sheets—Sheet 2.
W. HEDTMANN, E. HENKELS, A. SCHMIEDEL & M. FISCHER.
BRAIDING MACHINE.
No. 293,020. Patented Feb. 5, 1884.
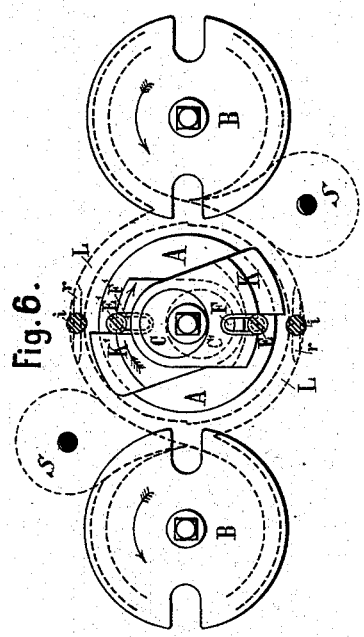
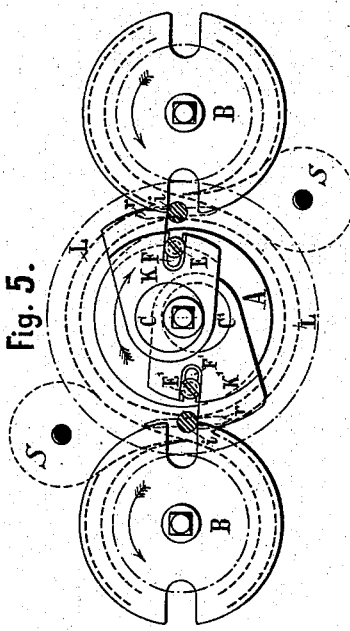
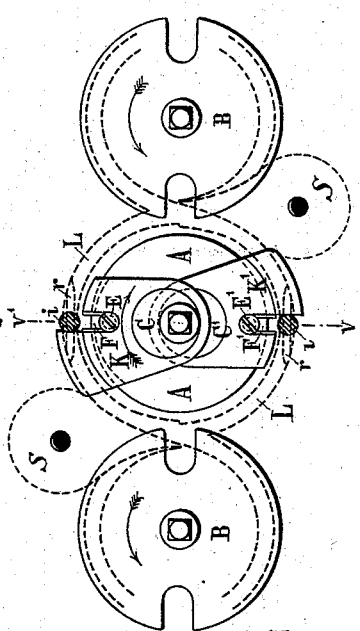

(No Model.)  3 Sheets—Sheet 3.

W. HEDTMANN, E. HENKELS, A. SCHMIEDEL & M. FISCHER.
BRAIDING MACHINE.

No. 293,020. Patented Feb. 5, 1884.

Attest:
Geo. H. Graham
T. H. Palmer

Inventors:
Wilhelm Hedtmann, Ernst Henkels,
August Schmiedel & Max Fischer
by Munson & Philipp
Attys.

UNITED STATES PATENT OFFICE.

WILHELM HEDTMANN, ERNST HENKELS, AND AUGUST SCHMIEDEL, OF LANGERFELD, NEAR BARMEN, AND MAX FISCHER, OF BERLIN, PRUSSIA, GERMANY, ASSIGNORS TO ALBERT HENKELS, OF LANGERFELD, NEAR BARMEN, PRUSSIA, GERMANY.

BRAIDING-MACHINE.

SPECIFICATION forming part of Letters Patent No. 293,020, dated February 5, 1884.

Application filed February 20, 1882. (No model.) Patented in Germany July 30, 1881, No. 20,712, and November 1, 1881, No. 18,809.

*To all whom it may concern:*

Be it known that we, WILHELM HEDTMANN, ERNST HENKELS, and AUGUST SCHMIEDEL, of Langerfeld, near Barmen, Prussia, Germany, and MAX FISCHER, of Berlin, Prussia, Germany, have invented new and useful Improvements in Braiding-Machines, of which the following is a specification.

Our invention relates, especially, to improvements in the braiding-machine for which Letters Patent of the United States were granted to Wilhelm Hedtmann, November 13, 1883, No. 288,236, but is applicable to other machines of similar character. Its subject-matter consists in new devices whereby a spool, while passing along the guide-track of a main head, may be stopped for a certain period, and then caused to resume its motion.

In order to understand the purpose and operation of the present improvement, it is necessary to take into account what has been set forth in the aforesaid patent about the nature and the object of the braiding-machine as there described. In the first place, it is stated that the object of the machine is to produce lace similar to hand-made lace, and of various patterns. Then the machine is described as consisting, mainly, of a series of driving-heads of different character—*i. e.*, of main heads, intermediate heads, and auxiliary heads, operating to propel the spools which carry the plaiting-threads along curved guide-tracks. Moreover, the terms "wing" and "length of a wing" are explained, and it has been set forth that the main heads as used in the machine have virtually the same size as if they were provided with four wings, but that two of the wings are cut away. Further, the switches and their purpose are explained. Thereafter the specification dwells at length on the necessity of keeping the spools at a definite distance apart from each other, and shows by what means their proper relative distance is restored, when, on account of the different courses in which the spools are directed, this distance has been altered. The means described for this purpose consist in auxiliary heads or in the equivalent branch tracks, together with the omission of wings on the main heads.

The object of the present invention is to replace the said auxiliary heads or branch tracks, together with the mechanisms required therefor, by other and simpler devices, whereby a great variety of patterns not being of a very complicated nature may be made.

The invention is represented on the annexed three sheets of drawings.

Figures 1, 2, and 3 are three top views of a portion of one arrangement of our improved machine, with its movable parts in different positions. Fig. 4 is an elevation thereof with the parts in the position corresponding to Fig. 1. Figs. 5, 6, and 7 are three top views of a modified arrangement, while Fig. 8 is a vertical section on line $v\,v'$ of Fig. 7. Figs. 9 to 13, finally, are five diagrams showing the operation of the main heads constructed according to the invention. In Figs. 1, 2, 3, 5, 6, and 7 the different heads have been represented as being arranged in a straight line. In the machine as practically carried out their centers are, however, placed in a circle.

The improvement substantially consists in providing each main head—such as A—with two drivers, K and K', rotating eccentrically to a circular or nearly circular guide-track, L, so that, according to the position of a spool in the track, the driver which is next behind it will either act on the spool of the spool-carrier or pass by the side thereof, the spool in the latter case remaining at rest until the following driver strikes against its pivot and moves it forward.

In the drawings, the main heads A and intermediate heads, B, have hollow bearings or bases, as H I, whereby they are mounted to rotate on stationary axles, as G, fixed in the top and bottom plates, 20·30, said hollow bearings being provided with toothed wheels, as 11 12, (which find their counterparts in the wheels 10 and 11 of the aforesaid patent,) whereby proper rotation of each is effected, the heads B making, in the instance shown, two turns, while the heads A make one turn. The top plate is provided with a guide-track, L, in which the pivots $i$ of the spool-carrier 50 are guided as the spools are propelled.

In Figs. 1 to 4 the drivers K K' are fixed to the main head A, which rotates on an axle placed eccentrically to the guide-track L. (Shown by dotted lines.) The axle may be on one side or the other of the center of L, provided it be together with the latter in the same radial line of the machine, or thereabout. The main head is of the size of a four-winged head; but it has actually only two wings or drivers, as in the machine shown in said patent; or, in other words, the head would have four wings if each of these were to correspond with one of the two wings of either of the cooperating intermediate heads, B, which have two wings and rotate twice as fast; but the alternate wings of the main head are omitted, while the size of the head is retained. The said main-head wings or drivers, whose operating-faces are at $a$ and $a'$, are formed either by annular segments or by simple tappets or drivers K and K', projecting upward from a disk or from arms attached to the boss H, and arranged to pass below the ends of the spool-pivots $i$. The drivers are placed at different distances from their center of rotation, and so that the one K will pass outside of the pivot of a spool-carrier being in the part L' of the guide-track L, (see Fig. 2,) while the driver K' passes inside of the pivot of a spool-carrier at $L^2$; but when the drivers are in the opposite positions, as in Fig. 3, K will act on a spool-carrier being at $L^2$, while K' acts on a carrier at L'. In consequence, either of the two drivers will propel forward any spool which is at or near one of the points where the track L passes over into the track of the adjacent intermediate heads, B, (see Fig. 1;) but the driver K, having pushed forward a spool from the position shown in Fig. 1, will come out of engagement with the carrier-pivot thereof and pass outside of the same when the spool has arrived at or near L', as in Fig. 2, so that the carrier and its spool then remain at rest and out of operation in this position until, after another half-rotation of the head, the driver K' pushes it forward again.

While in the arrangement shown by Figs. 1 to 4 the main driving-head is placed eccentrically to the guide-track, an eccentric motion of the drivers K and K', when each consists of a separate piece, is obtained (according to Figs. 5 to 8) by the eccentrics C and C', around which the drivers rotate. The said eccentrics are fixed on the stationary axle G, Fig. 8, in such a manner that their centers are located on opposite sides of the axes G, while both lie in a radial line drawn through the latter to the center of the machine. The drivers are rotated by the pins E and E', screwed into the top disk of the main head A, and projecting into the slits F and F', respectively. The heads of the pins are made conical and the said slits dovetailed, for the purpose of preventing a separation of the drivers from the disk. When these drivers are in the position shown by Figs. 5 and 7, each of them will operate on the spool that is in front of it. At a certain point of every rotation, however, their eccentric motion causes them to be simultaneously withdrawn from the pivots of the spools which they have been driving, (see Fig. 6,) so that these spools will then remain at rest until the drivers, having made a half-revolution together with the main head, are projected outward again and put in the position to resume their action on the spools.

The switches S, by which the spools are directed into one track or another, (which find their counterparts in the switches $a'$ $b'$ and $a'$ $b^2$ of the aforesaid patent,) are operated by any common mechanism by which they will be vibrated in proper time, or by a controlling apparatus, in the manner shown and described in the patent referred to.

Figs. 9 to 13 show in five diagrams how the spools are operated in a braiding-machine constructed with main heads according to the first modification of our present invention. The same operations, of course, take place in a machine constructed with main heads according to the second modification, only the representation of these main heads in the diagrams would slightly differ, because their axis lies in the center. In these diagrams the main heads are marked A' A², &c., and the intermediate heads are marked $B^{0\text{-}'}$ and $B'^{\text{-}2}$, &c., to show their duplication in an actual machine and aid the description here. A' A² to A⁵ are five successive main heads of a braiding-machine of any size. $B'^{\text{-}2}$ $B^{2\text{-}3}$, &c., are the intermediate heads. The first rotate to the right, the latter to the left. In the diagrams the several heads are arranged in a straight line, whereas in practice they are usually arranged in a circle. The switches S between the main heads and the intermediate heads are marked by thick lines radiating from the axles of the switches.

Figure 10:
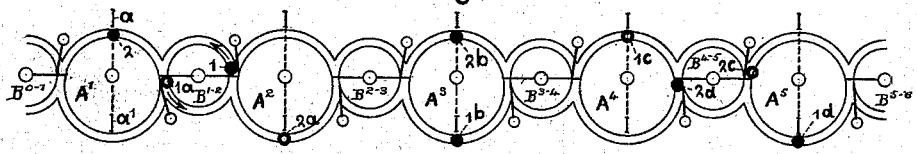
Figure 11:
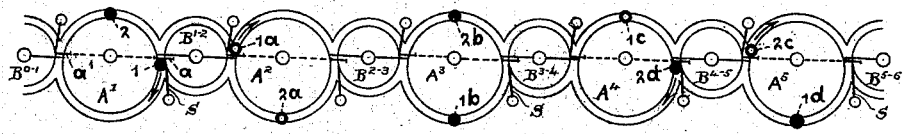

In the successive diagrams the heads are imagined to be advanced always by one wing's length. Two spools, 1 2 or 1ª 2ª, &c., are arranged on each main head, the latter being of the size of four-winged heads, but only provided with two wings, as has been explained before. The spools 1 and 1ª of the main heads A' and A² are supposed to pass over the intermediate head, $B'^{\text{-}2}$, to make there one rotation, and then to return to the relative main head—that is, the threads of said spools are supposed to link with each other. Thereby the spools make a way of two wings' length on the intermediate head, Figs. 9 to 11. It will now be seen that if the other spools, 2 and 2ª, of the main heads A' and A² should meanwhile travel on upon the main heads, such spools would arrive, at the time illustrated in the diagram Fig. 11, at the same points of the main heads where the spools 1 and 1ª are about to pass over these main heads, and a collision of the spools would occur. In order to avoid this collision, the spools 2 and 2ª must become regulated in some manner, and according to the present invention this is effected by retaining the spools in the relative parts of the guide-track by the eccentrical rotation of the driving-edges of the main heads, as the diagrams Figs. 10 and 11 show. In the braiding-machines described in the aforesaid patent the same retarding effect is attained by conducting the spools which are to be regulated over the so-called "auxiliary heads," or by retaining them in the equivalently-operating branch tracks. The spools $1^b$ and $2^b$ are supposed to turn round on the main head $A^3$ in the same manner as the spools 2 and $2^a$ of the main heads $A'$ and $A^2$, whereby the threads are twisted and become regulated—that is, they are retained in the spool-track for two wings' length, or for one half-rotation of the main heads, so that, as in the diagram Fig. 12, in which the driving-edges $a$ and $a'$ are about to propel the spools again, the said spools have the proper reciprocate position with reference to the spools of the main head $A^2$ as to those of the main head $A'$. The spool $2^c$ of the main head $A^4$, at last, is supposed to pass over the intermediate head, $B^{4.5}$, to the main head $A^5$, and the spool $2^d$ of the main head $A^5$, vice versa, to the main head $A^4$—that is, the threads of these two spools are to cross each other. The spools thereby make a way of one wing's length on the intermediate head and reach the other main head between its two driving-edges, (see Fig. 10,) so that they will not be driven on till after a further rotation of a wing's length of the main heads $A^4$ and $A^5$, Fig. 11. This again places them in their proper reciprocate position in regard to the other spools. The spools $1^c$ and $1^d$ of the main heads $A^4$ and $A^5$ meanwhile have been regulated in the same manner as described before by following the course of the spools 2 $2^a$ and $1^b$ $2^b$.

Figure 12:
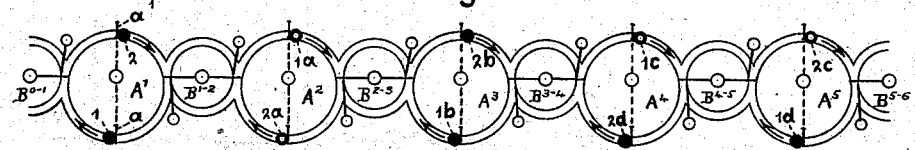
Figure 13:
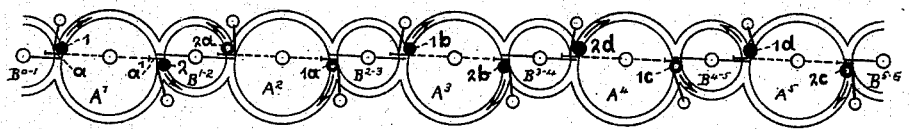

In the diagram Fig. 12 it will be seen that all the spools of the five main heads are in their proper reciprocate position, and in the diagram Fig. 13—that is, after the spools have proceeded by a wing's length—the same operations as described may take place; or the several operations may be changed according as the switches operated by the controlling or pattern apparatus may design the way for the spools.

We claim as our invention—

1. The combination, with a circular or nearly circular spool-track, L, of the drivers K K', rotating eccentrically to the said track, substantially as and for the purpose described.

2. The combination, with a track, L, of the drivers K K', eccentrics C C', pins E E', and driving-head A, substantially as described.

In testimony whereof we have signed our names to this specification in the presence of subscribing witnesses.

WILHELM HEDTMANN.
ERNST HENKELS.
AUGUST SCHMIEDEL.
MAX FISCHER.

Witnesses to the signatures of W. Hedtmann, Ernst Henkels, and Aug. Schmiedel:
CARL FERIE,
CARL MARKMANN.

Witnesses to the signature of Max Fischer:
HENRY SPRINGMANN,
B. ROI.